(12) United States Patent
Ferber et al.

(10) Patent No.: US 7,596,055 B2
(45) Date of Patent: Sep. 29, 2009

(54) ATTENUATING UNWANTED SIGNAL USING INTERFEROMETRY TECHNIQUES

(75) Inventors: Ralf Ferber, Horsham (GB); Christophe Zaroli, Geispolsheim-Gare (FR)

(73) Assignee: WesternGeco L.L.C., Houston, TX (US)

( * ) Notice: Subject to any disclaimer, the term of this patent is extended or adjusted under 35 U.S.C. 154(b) by 3 days.

(21) Appl. No.: 11/567,206

(22) Filed: Dec. 5, 2006

(65) Prior Publication Data
US 2008/0130410 A1 Jun. 5, 2008

(51) Int. Cl.
*G01V 1/00* (2006.01)

(52) U.S. Cl. .................................................. 367/46

(58) Field of Classification Search ............... 367/46, 367/52; 702/18
See application file for complete search history.

(56) References Cited

U.S. PATENT DOCUMENTS

| 4,608,673 | A | | 8/1986 | Lazear |
| 4,843,597 | A | * | 6/1989 | Gjessing et al. ............... 367/15 |
| 4,887,243 | A | | 12/1989 | Pann |
| 5,396,472 | A | | 3/1995 | Paffenholz |
| 5,524,100 | A | | 6/1996 | Paffenholz |
| 5,587,967 | A | * | 12/1996 | Ferber .......................... 367/53 |
| 5,991,238 | A | | 11/1999 | Barr |
| 6,011,505 | A | * | 1/2000 | Poehler et al. ............ 342/25 C |
| 6,130,644 | A | * | 10/2000 | Massonnet .................. 342/453 |
| 6,571,014 | B1 | * | 5/2003 | Larkin .......................... 382/232 |
| 6,668,228 | B1 | * | 12/2003 | Ozbek et al. .................. 702/17 |
| 6,807,489 | B2 | | 10/2004 | Naville et al. |
| 6,931,362 | B2 | | 8/2005 | Beadle et al. |
| 6,999,880 | B2 | | 2/2006 | Lee |
| 2002/0103602 | A1 | | 8/2002 | Meng |
| 2007/0104028 | A1 | * | 5/2007 | Van Manen et al. ........... 367/38 |
| 2007/0127313 | A1 | * | 6/2007 | Segall et al. ................... 367/38 |

FOREIGN PATENT DOCUMENTS

| GB | 1 400 044 | 7/1975 |
| GB | 1 447 873 | 9/1976 |

OTHER PUBLICATIONS

Coda wave Interferometry. McGraw-Hill Yearbook of Science & Technology 2004.*
Draganov et al. Seismic Interferometry: Reconstructing the Earth's reflection response. Geophysics. vol. 71. No. 4. Jul.-Aug. 2006. p. S161-170.*

(Continued)

*Primary Examiner*—Mark Hellner
(74) *Attorney, Agent, or Firm*—Ari Pramudji; Liangang (Mark) Ye; Jeffrey E. Griffin

(57) ABSTRACT

A method to attenuate unwanted signals in seismic data using seismic interferometry techniques. In one implementation, seismograms may be converted into seismic interferograms. In the seismic interferogram domain, unwanted signals may be attenuated by various techniques, such as muting, filtering and the like. The modified seismic interferograms may then be converted back into seismograms with the unwanted signals having been attenuated.

17 Claims, 4 Drawing Sheets

OTHER PUBLICATIONS

Weglein et al. An inverse-scattering series method for attenuating multiples in seismic reflection data. Geophysics. vol. 62. No. 6. Nov.-Dec. 1997. pp. 1975-1989.*

Dragoset et al. Some Remarks on Surface Multiple Attenuation. Geophysics. vol. 63. No. 2. Mar.-Apr. 1998. pp. 772-789.*

Fan et al. Removing free-surface multiples from teleseismic transmission and constructed reflection responses using reciprocity and the inverse scattering series. Geophysics. vol. 171. No. 4. Jul.-Aug. 2006; p. S171-S178.*

Curtis et al. Seismic Interferometry-turning noise into signal. The Leading Edge. Sep. 2006. pp. 1082-1092.*

He, Ruiqing. Wave-Equation Interferometric Migration of VSP Data. Dissertation for PhD in Geophysics. The University of Utah. May 2006.*

Lee and Kim, "Source-independent full-waveform inversion of seismic data," *Geophys.*, 68(6):2010-2015, 2003.

Snieder and Safak, "Extracting the building response using seismic interferometry: Theory and application to the Millikan Library in Pasadena, California," *Bulletin of the Seismological Society of America*, 96(2):586-598, 2006.

* cited by examiner

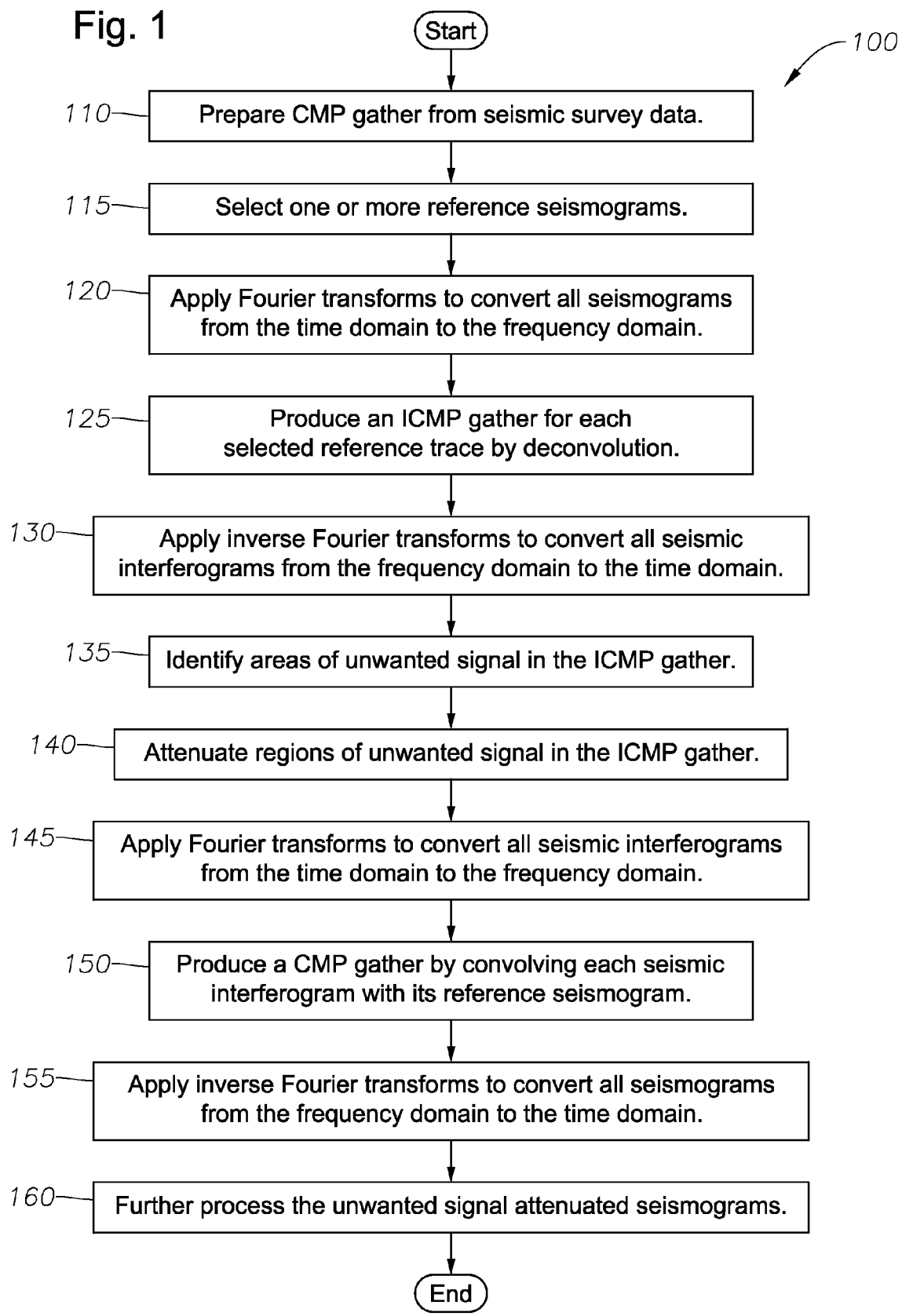

ATTENUATING UNWANTED SIGNAL USING INTERFEROMETRY TECHNIQUES

CROSS-REFERENCE TO RELATED APPLICATIONS

This application is related to co-pending U.S. patent application Ser. No. 11/567,205, filed on Dec. 5, 2006, having the title of PROCESSING SEISMIC DATA USING INTERFEROMETRY TECHNIQUES, which is incorporated herein by reference.

BACKGROUND

1. Field of the Invention

Implementations of various technologies described herein generally relate to seismic data processing.

2. Description of the Related Art

The following descriptions and examples are not admitted to be prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wavefield may be sampled by a plurality of seismic sensors, such as geophones, hydrophones and the like. Each sensor may be configured to acquire seismic data at the sensor's location, normally in the form of a seismogram representing the value of some characteristic of the seismic wavefield against time. A seismogram may also be commonly known as a seismic trace. The acquired seismograms may be transmitted wirelessly or over electrical or optical cables to a recorder system. The recorder system may then store, analyze, and/or transmit the seismograms. This data may be used to detect the possible presence of hydrocarbons, changes in the subsurface and the like.

Seismograms may contain unwanted signals, or noise, as well as the desired seismic reflection signals. Unwanted signals may interfere with the interpretation of the seismic signals and degrade the quality of the subsurface images obtained by processing the recorded seismograms. It may therefore be desirable to suppress or attenuate the unwanted signal that may be present in the recorded seismograms during processing. Various techniques have been developed to process seismograms in an effort to amplify the seismic reflection signals and attenuate the unwanted signals. Various techniques have also been developed to manipulate travel times in seismograms. Deconvolution, which may also be referred to as spectral division, may be one such technique. After deconvolution, the seismic data may be recorded according to travel time difference rather than travel time.

Current techniques for attenuating unwanted signals often fail to adequately amplify the reflection signal and attenuate the unwanted signal. Accordingly, a need exists in the art for a new method for attenuating unwanted signals.

SUMMARY

Described herein are implementations of various technologies for a method for processing seismic data. In one implementation, the method may include converting a gather of seismograms into one or more interferogram gathers, attenuating one or more areas of unwanted signal in the interferogram gathers and converting the attenuated interferogram gathers into an attenuated gather of seismograms.

Described herein are also implementations of various technologies for a computer system, which may include a processor and a memory comprising program instructions executable by the processor to: prepare one or more seismograms into a gather, convert the gather of seismograms into one or more interferogram gathers and attenuate one or more areas of unwanted signal in the interferogram gathers.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 1 illustrates a flow diagram of a method to attenuate unwanted signals in seismic data using seismic interferometry techniques in accordance with implementations of various technologies described herein.

DETAILED DESCRIPTION

In general, one or more implementations of various technologies described herein are directed to a method to attenuate unwanted signals in seismic data using seismic interferometry techniques. In one implementation, seismograms may be converted into seismic interferograms. In the seismic interferogram domain, unwanted signals may be attenuated by various techniques, such as muting, filtering and the like. The modified seismic interferograms may then be converted back into seismograms with the unwanted signals having been attenuated. The method and its various implementations will be described in more detail in the following paragraphs.

FIG. 1 illustrates a flow diagram of a method 100 to attenuate unwanted signals in seismic data using seismic interferometry techniques in accordance with implementations of various technologies described herein. It should be understood that while the operational flow diagram indicates a particular order of execution of the operations, in some implementations, the operations might be executed in a different order.

Figure 2B:
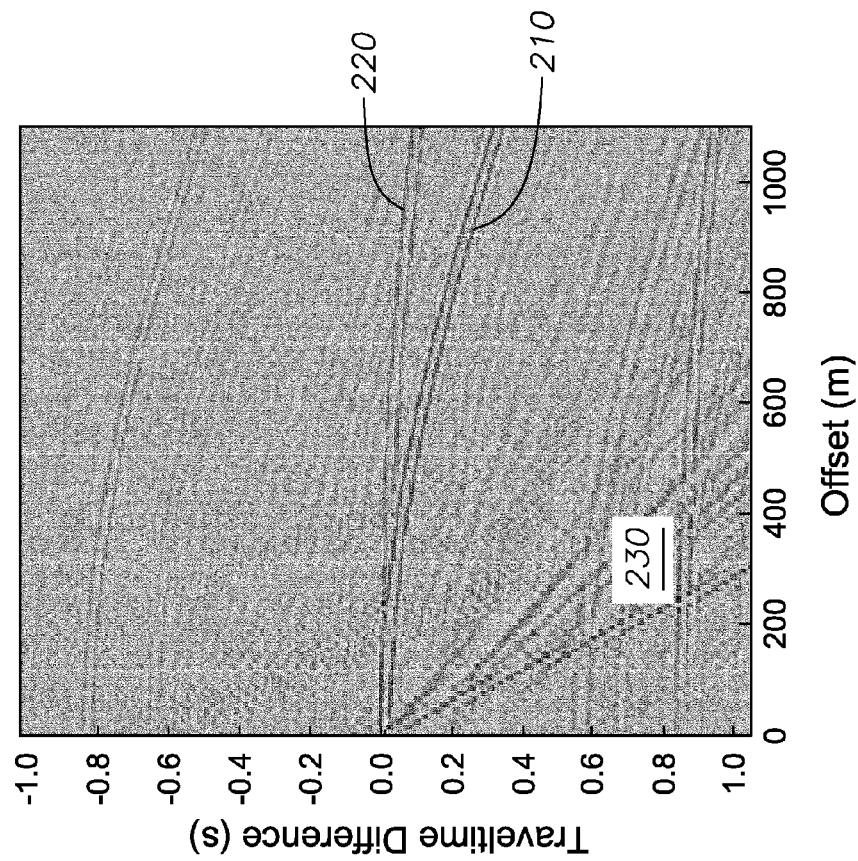
FIGS. 2A-D illustrate a method to attenuate unwanted signals in seismic data using seismic interferometry techniques in accordance with implementations of various technologies described herein.
Figure 2A:
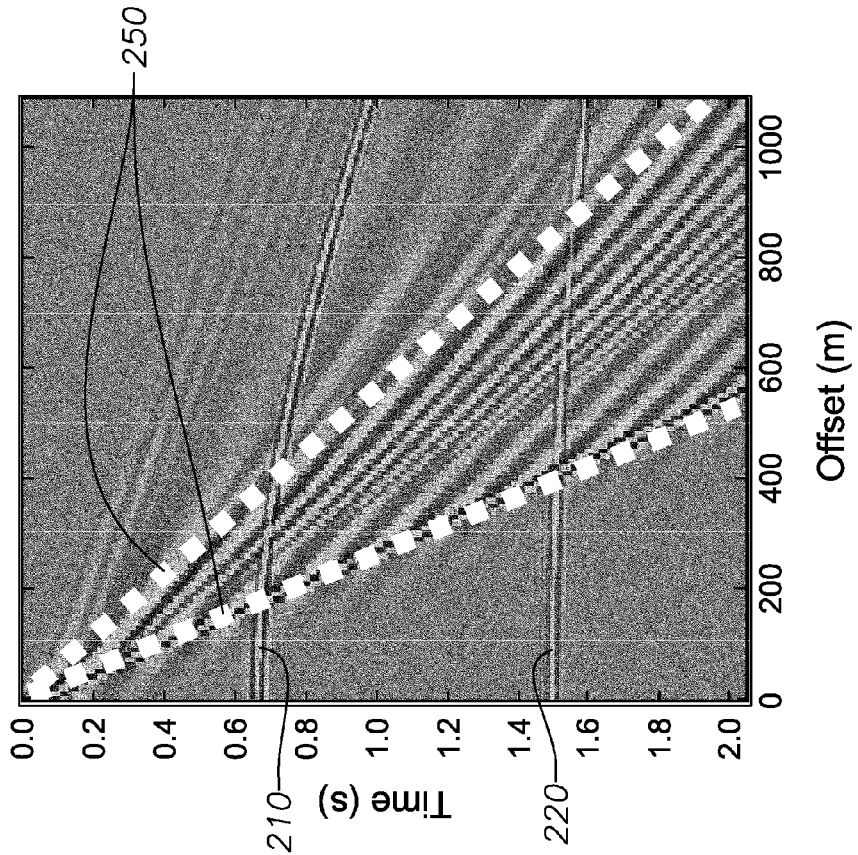

At step 110, a common midpoint (CMP) gather may be prepared using seismograms from any type of seismic survey, such as land or marine. A CMP is a point on the earth's surface that is equidistant from one or more source and sensor pairs. The CMP on the earth's surface may be directly above a seismic reflection event below the earth's surface. In a typical seismic survey, there may be a plurality of CMPs. During processing, the survey seismograms may be sorted such that seismograms having the same CMP are grouped together. A group of seismograms sharing a CMP is known as a CMP gather. FIG. 2A illustrates a CMP gather where each vertical entry represents a seismogram. Each seismogram may be located at a given offset from the CMP along the x-axis with amplitudes recorded for each time plotted along the y-axis. Note in FIG. 2A that there are two events, a first event 210 beginning at substantially 0.7 seconds and a second event 220 beginning at substantially 1.5 seconds. Note also the unwanted signal in the cone-shaped area bordered by dotted lines 250. In this example the unwanted signal may be primarily in a cone-shaped area; however unwanted signal may be present in any area. Although various implementations are described herein with reference to a CMP gather, it should be understood that in some implementations, the seismograms may be grouped into other types of gathers, such as common source, common receiver or common offset gathers.

The seismograms may then be converted to seismic interferograms. Accordingly, steps 115-125 describe such conversion in more detail. In the field of interferometry, seismograms may be converted into seismic interferograms by deconvolving two seismograms that have been transformed from the time domain into the frequency domain. This process combines the two seismograms into one seismic interferogram that contains the difference between the two seismograms, cancelling out all that may be in common between the seismograms such as unwanted signals.

At step 115, one or more of the seismograms in the CMP gather may be selected as reference seismograms. In one implementation, all seismograms in a CMP gather may be selected as reference seismograms. At step 120, each seismogram in the CMP gather may be converted from the time domain to the frequency domain using Fourier transforms.

At step 125, each seismogram of the CMP gather may be deconvolved by each reference seismogram. For example, each seismogram of the CMP gather may be deconvolved by a first reference seismogram. Each deconvolution may generate a seismic interferogram. Hence, for one reference seismogram, as many seismic interferograms may be generated as seismograms in the original CMP gather. All seismic interferograms generated by one reference seismogram may be referred to as an interferogram CMP (ICMP) gather. Next, each seismogram of the original CMP gather may be deconvolved by a second reference seismogram to generate another ICMP gather. Thus, the deconvolution process may yield as many ICMP gathers as selected reference seismograms and as many seismic interferograms in each ICMP gather as seismograms in the original CMP gather.

The mathematical computation performed by deconvolution may cause all common convolution components between each seismogram and the reference seismogram to be eliminated. If the seismograms were collected in close time and proximity, as in a CMP gather, it may be assumed that many unwanted signals may be common components, such as the source wavelet, common near-surface effects on both the source and receiver side, common absorption wavelet, and the like. For example, each seismogram in the frequency domain may be represented by the following equation:

$$x_1(f) = w(f) \cdot r_1(f) \qquad \text{Equation 1.}$$

In Equation 1, $w(f)$ represents the unwanted signals and $r_1(f)$ represents the reflection signal. The reference seismogram may be represented by the following equation:

$$x_{ref}(f) = w(f) \cdot r_{ref}(f) \qquad \text{Equation 2.}$$

In Equation 2, $w(f)$ represents the unwanted signals and $r_{ref}(f)$ represents the reflection signal of the reference seismogram.

The seismogram represented by Equation 1 may be deconvolved with the reference seismogram of Equation 2 to form the following equation:

$$\frac{x_1(f)}{x_{ref}(f)} = \frac{w(f)}{w(f)} \cdot \frac{r_1(f)}{r_{ref}(f)}. \qquad \text{Equation 3}$$

Because the common unwanted signals $w(f)$ cancel out of Equation 3, common unwanted signals $w(f)$ may be eliminated via the deconvolution process. Thus, converting seismograms to seismic interferograms may eliminate common unwanted signal and improve the signal-to-noise ratio in the seismic data. It should be noted that the deconvolution process may also be referred to as spectral division. It should also be noted that the deconvolution process may be replaced by a correlation process. In one implementation, the seismic interferograms may be created in a time variant manner, for example using sliding time windows.

At step 130, an inverse Fourier transform may be applied to each seismic interferogram to convert them from the frequency domain back into the time domain. The resulting traveltime information in a seismic interferogram may be a relative traveltime in the form of the difference of the traveltimes of the seismogram and the reference seismogram that were deconvolved to produce it. The traveltime may be relative to the reference seismogram used to calculate the ICMP gather. For example, if an event exists at traveltime $t_a$ in a seismogram and at traveltime $t_{ref}$ in the reference seismogram, the seismic interferogram may have the event at the traveltime difference represented in Equation 4 below.

$$\tau = t_a - t_{ref} \qquad \text{Equation 4}$$

Thus, the traveltime information of the original data may still be encoded in the seismic interferograms. FIG. 2B illustrates an ICMP gather where each vertical entry represents a seismic interferogram. Each seismic interferogram may be located at a given offset from the CMP along the x-axis with amplitudes recorded for each traveltime difference plotted along the y-axis. The ICMP gather illustrated in FIG. 2B shows the data from the CMP gather illustrated in FIG. 2A in the seismic interferogram domain. Note that in the seismic interferogram domain, all events may begin at time equal to zero with a maximum variation along the time axis equal to the largest time difference between seismograms in the original CMP gather. For example, in FIG. 2A, the first event 210 occurs from time equal to approximately 0.7 seconds to time equal to approximately 1.0 seconds. Therefore the maximum time difference between any selected reference seismogram and any other seismogram may be approximately 0.3 seconds. In FIG. 2B, the seismic interferogram time difference for the first event 210 ranges from 0 seconds to approximately 0.3 seconds. The second event 220 may have a much shallower slope in the seismic interferogram domain because the maximum time difference between any reference seismogram and any other seismogram in the seismogram domain may be approximately 0.1 seconds.

At step 135, areas of unwanted signal may be identified in the ICMP gather. Because in the seismic interferogram domain events may be plotted versus traveltime differences instead of traveltimes, the events may be moved and areas of noise that may have been superimposed on the events may now be isolated. In FIG. 2B for example, the area 230 below the first event 210 and second event 220 may be identified as an area 230 of unwanted signal.

Figure 2D:
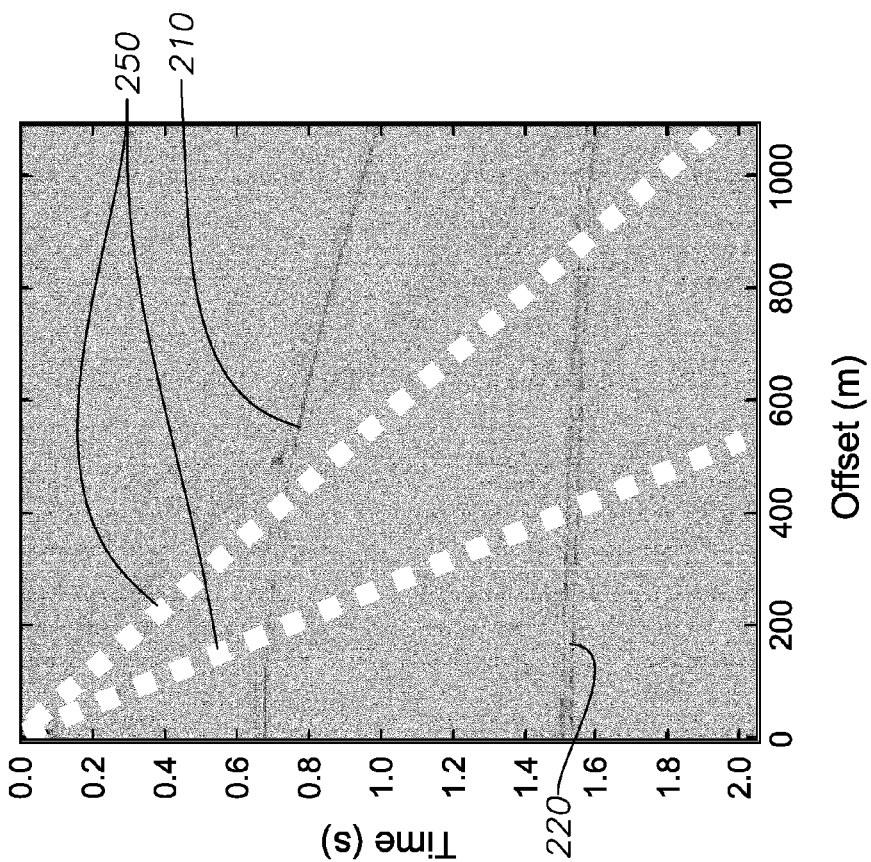
Figure 2C:
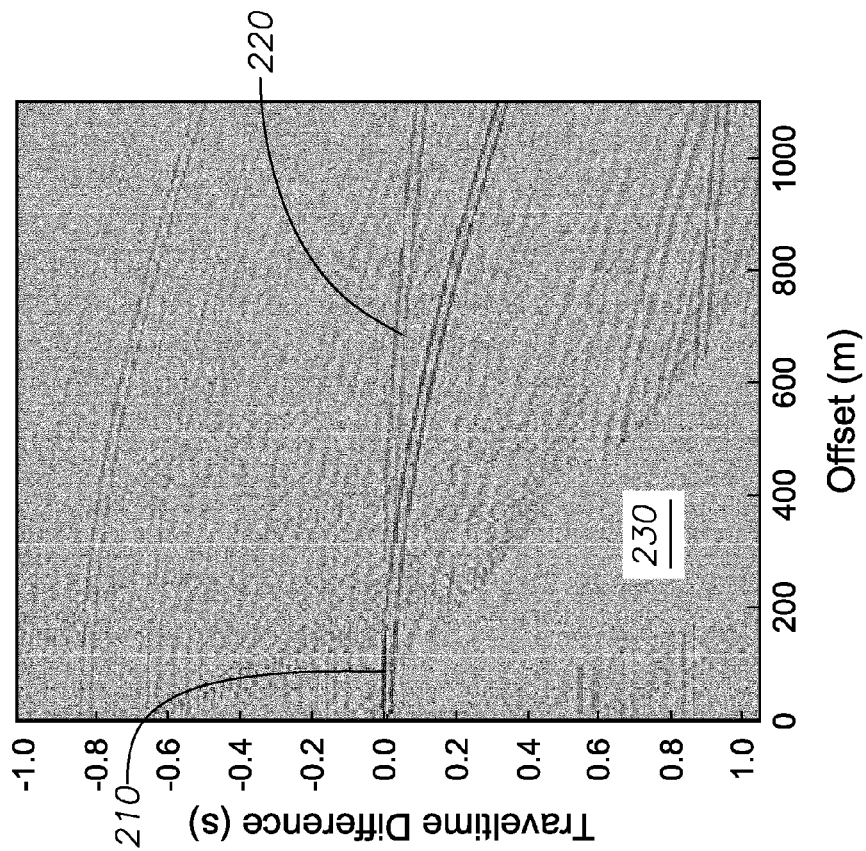

At step 140, the identified areas of unwanted signal may be attenuated. Various methods for attenuating the unwanted signal may include muting, filtering and the like. Muting may be accomplished by first determining one or more sets of traveltime difference and offset coordinates corresponding to the areas of unwanted signal in one or more seismic interferograms and then setting the interferogram amplitudes to zero for the one or more determined sets of traveltime difference and offset coordinates. Filtering may be accomplished by identifying the space-time dip of the unwanted signals, designing a filter that attenuates signals with the corresponding dip and applying the filter to the areas of unwanted signal. In FIG. 2C, the unwanted signal has been attenuated in the identified area 230.

At step 145, the seismic interferograms may be converted from the time domain to the frequency domain by applying Fourier transforms. At step 150, each ICMP gather may be convolved with its corresponding reference seismogram to produce a CMP gather. At step 155, the seismograms in the CMP gather may be converted from the frequency domain to the time domain by applying inverse Fourier transforms. FIG. 2D illustrates the CMP gather in FIG. 2A without the unwanted signal 230. Notably, the unwanted signal present in FIG. 2A in the cone-shaped area bordered by dotted lines 250 may be substantially eliminated as illustrated in FIG. 2D. However, the first event 210 and second event 220 may be substantially unaffected.

At step 160, the attenuated seismograms may be further processed. Method 100 may be applied at or near the beginning of the processing of seismic data such that the unwanted signal may be attenuated before typical processing steps.

Figure 3:
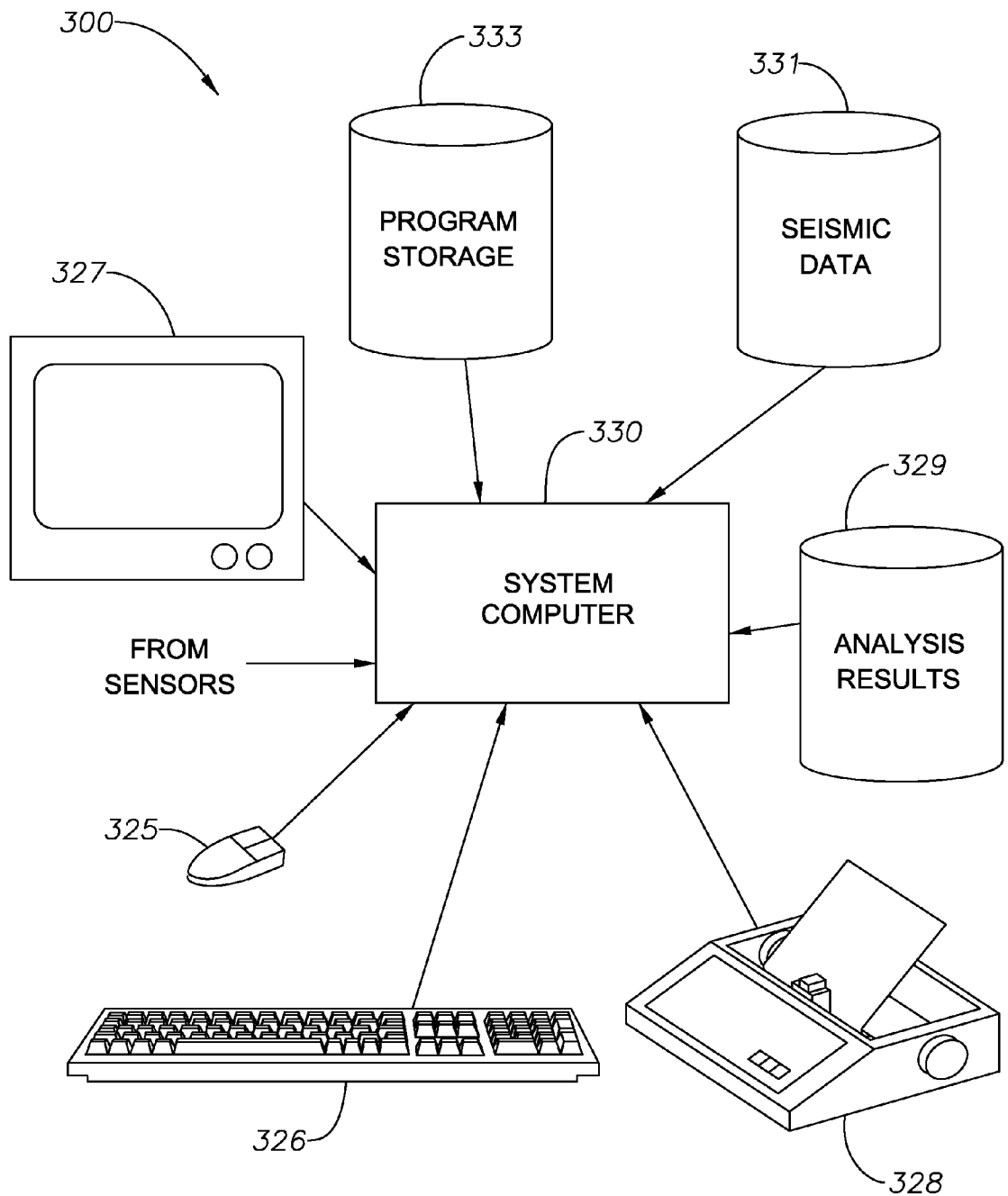
FIG. 3 illustrates a computer system, into which implementations of various technologies described herein may be implemented.

FIG. 3 illustrates a computer system 300, into which implementations of various technologies described herein may be implemented. The computer system 300 may include one or more system computers 330, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 330 may be in communication with disk storage devices 329, 331, and 333, which may be external hard disk storage devices. It is contemplated that disk storage devices 329, 331, and 333 are conventional hard disk drives, and as such, will be implemented by way of a local area network or by remote access. Of course, while disk storage devices 329, 331, and 333 are illustrated as separate devices, a single disk storage device may be used to store any and all of the program instructions, measurement data, and results as desired.

In one implementation, seismic data from the receivers may be stored in disk storage device 331. The system computer 330 may retrieve the appropriate data from the disk storage device 331 to process seismic data according to program instructions that correspond to implementations of various technologies described herein. The program instructions may be written in a computer programming language, such as C++, Java and the like. The program instructions may be stored in a computer-readable medium, such as program disk storage device 333. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 330. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 330 may present output primarily onto graphics display 327, or alternatively via printer 328. The system computer 330 may store the results of the methods described above on disk storage 329, for later use and further analysis. The keyboard 326 and the pointing device (e.g., a mouse, trackball, or the like) 325 may be provided with the system computer 330 to enable interactive operation.

The system computer 330 may be located at a data center remote from the survey region. The system computer 330 may be in communication with the receivers (either directly or via a recording unit, not shown), to receive signals indicative of the reflected seismic energy. These signals, after conventional formatting and other initial processing, may be stored by the system computer 330 as digital data in the disk storage 331 for subsequent retrieval and processing in the manner described above. While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data for geological exploration, comprising:
   receiving one or more seismograms that were acquired by one or more seismic sensors;
   sorting the seismograms into a gather;
   converting the gather of seismograms into one or more interferogram gathers;
   attenuating one or more areas of unwanted signal in the interferogram gathers;

converting the attenuated interferogram gathers into an attenuated gather of seismograms; and presenting the attenuated gather of seismograms on a computer display.

2. The method of claim 1, wherein attenuating the areas of unwanted signal comprises:
   identifying the areas of unwanted signal in the interferogram gathers;
   identifying a space-time dip of the areas of unwanted signal;
   designing a filter having the space-time dip; and
   applying the filter to the areas of unwanted signal.

3. The method of claim 1, wherein attenuating the areas of unwanted signal in the interferogram gathers comprises:
   identifying the areas of unwanted signal in the interferogram gathers;
   determining one or more sets of traveltime difference and offset coordinates that correspond to the areas of unwanted signal in the interferogram gathers; and
   setting an amplitude in the interferogram gathers to zero at the determined sets of traveltime difference and offset coordinates.

4. The method of claim 1, wherein converting the gather of seismograms into the interferogram gathers comprises:
   selecting one or more seismograms as reference seismograms; and
   deconvolving each seismogram in the gather with each reference seismogram.

5. The method of claim 1, wherein converting the attenuated interferogram gathers into the attenuated gather of seismograms comprises convolving each seismic interferogram with a reference seismogram.

6. The method of claim 1, wherein converting the attenuated interferogram gathers into the attenuated gather of seismograms comprises:
   applying a Fourier transform to each seismic interferogram;
   convolving each seismic interferogram with a reference seismogram to generate seismograms; and
   applying an inverse Fourier transform to each seismogram.

7. The method of claim 1, wherein converting the gather of seismograms into the interferogram gathers comprises:
   selecting one or more seismograms as reference seismograms;
   applying a Fourier transform to each seismogram; and
   deconvolving each Fourier transformed seismogram in the gather with each reference seismogram to generate the interferogram gathers.

8. The method of claim 7, wherein converting the gather of seismograms into the interferogram gathers further comprises applying an inverse Fourier transform to each seismic interferogram in each interferogram gather.

9. The method of claim 1, wherein the gather of seismograms is a common midpoint (CMP) gather.

10. A computer system, comprising:
    a processor; and
    a memory comprising program instructions executable by the processor to:
       receive one or more seismograms that were acquired by one or more seismic sensors;
       prepare the seismograms into a gather;
       convert the gather of seismograms into one or more interferogram gathers;
       attenuate one or more areas of unwanted signal in the interferogram gathers;
       convert the attenuated interferogram gathers into an attenuated gather of seismograms; and
       present the attenuated gather of seismograms on a computer display.

11. The computer system of claim 10, wherein the program instructions executable by the processor to attenuate one or more areas of unwanted signal in the interferogram gathers comprises program instructions executable by the processor to:
    identify the areas of unwanted signal in the interferogram gathers;
    identify a space-time dip of the areas of unwanted signal;
    design a filter having the space-time dip; and
    apply the filter to the areas of unwanted signal.

12. The computer system of claim 10, wherein the program instructions executable by the processor to attenuate one or more areas of unwanted signal in the interferogram gathers comprises program instructions executable by the processor to:
    identify the areas of unwanted signal in the interferogram gathers;
    determine one or more sets of traveltime difference and offset coordinates that correspond to the areas of unwanted signal in the interferogram gathers; and
    set an amplitude in the interferogram gathers to zero at the determined sets of traveltime difference and offset coordinates.

13. The computer system of claim 10, wherein the memory comprising program instructions executable by the processor to convert the gather of seismograms into the interferogram gathers comprises program instructions executable by the processor to:
    select one or more seismograms as reference seismograms; and
    deconvolve each seismogram in the gather with each reference seismogram.

14. The computer system of claim 10, wherein the memory comprising program instructions executable by the processor to convert the gather of seismograms into the interferogram gathers comprises program instructions executable by the processor to:
    select one or more seismograms as reference seismograms;
    apply a Fourier transform to each seismogram; and
    deconvolve each Fourier transformed seismogram in the gather with each reference seismogram to generate the interferogram gathers.

15. The computer system of claim 14, wherein the memory comprising program instructions executable by the processor to convert the gather of seismograms into the interferogram gathers further comprises program instructions executable by the processor to apply an inverse Fourier transform to each seismic interferogram in each interferogram gather.

16. The computer system of claim 10, wherein the program instructions executable by the processor to convert the attenuated interferogram gathers into the attenuated gather of seismograms comprises program instructions executable by the processor to convolve each seismic interferogram with a reference seismogram.

17. The computer system of claim 10, wherein the memory comprising program instructions executable by the processor to convert the attenuated interferogram gathers into the attenuated gather of seismograms comprises program instructions executable by the processor to:
    apply a Fourier transform to each seismic interferogram;
    convolve each seismic interferogram with a reference seismogram to generate seismograms; and
    apply an inverse Fourier transform to each seismogram.

* * * * *